United States Patent
Qian et al.

(10) Patent No.: US 8,014,581 B2
(45) Date of Patent: Sep. 6, 2011

(54) 3D SEGMENTATION OF THE COLON IN MR COLONOGRAPHY

(75) Inventors: Zhen Qian, Piscataway, NJ (US); Matthias Wolf, Coatesville, PA (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 884 days.

(21) Appl. No.: 12/026,002

(22) Filed: Feb. 5, 2008

(65) Prior Publication Data
US 2008/0187202 A1 Aug. 7, 2008

Related U.S. Application Data

(60) Provisional application No. 60/888,393, filed on Feb. 6, 2007.

(51) Int. Cl.
*G06K 9/00* (2006.01)
(52) U.S. Cl. ........ 382/131; 382/128; 382/130; 382/173; 382/274; 250/455; 128/922
(58) Field of Classification Search .................. 382/128, 382/130, 131, 173, 274; 250/455; 128/922; 356/39; 378/41; 600/407, 425, 416
See application file for complete search history.

(56) References Cited

U.S. PATENT DOCUMENTS

| 7,043,290 B2* | 5/2006 | Young et al. ............... 600/416 |
| 2002/0168110 A1* | 11/2002 | Al-Kofahi et al. ............ 382/199 |
| 2008/0049991 A1* | 2/2008 | Gering ......................... 382/128 |
| 2008/0123927 A1* | 5/2008 | Miga et al. .................... 382/131 |
| 2008/0205749 A1* | 8/2008 | Sundaram et al. ............ 382/154 |

FOREIGN PATENT DOCUMENTS

| WO | 03/0215532 A2 | 3/2003 |
| WO | 2004/063988 A1 | 7/2004 |
| WO | 2006/069379 A2 | 6/2006 |

OTHER PUBLICATIONS

Kang et al., "A New Path Planning Algorithm for Maximizing Visibility in Computed Tomography Colonography", IEEE Transactions on Medical Imaging, IEEE Service Center, Piscataway, NJ, vol. 24, No. 8, Aug. 1, 2005, pp. 957-968.

Vilanova et al., "Cylindrical Approximation of Tubular Organs for Virtual Endoscopy", Computer Grahpics and Imaging 2000, Conference Proceedings, 2000, pp. 283-289.

(Continued)

*Primary Examiner* — Samir Ahmed
*Assistant Examiner* — Ali Bayat
(74) *Attorney, Agent, or Firm* — Peter Withstandley

(57) ABSTRACT

A method for segmenting a tubular structure includes providing a three-dimensional image containing the tubular structure, providing at least one seed point within the tubular structure, fitting an initial cylinder into the tubular structure at the seed point, adding cylinder segments to the initial cylinder in forward and backward directions within the three-dimensional image of the tubular structure by tracking the cylinder model over the tubular structure, modeling each cylinder segment using parameters to account for a three-dimensional orientation, a radius, a length and a curvature, describing an intensity image of the tubular structure using a second model to represent an edge and intensity distribution of the tubular structure, fitting the parameters as the cylinder segment is added to the intensity image, and outputting cylinder segments as a segmentation of the tube.

11 Claims, 8 Drawing Sheets

OTHER PUBLICATIONS

Oh et al., "A Segmentation and Abstraction of Blood Vessels From Volume Data for Surgical Simulation", International Conference on Artificial Reality and Tele-Existence, Dec. 1, 1999, pp. 92-97.

Kirbas et al., "A Review of Vessel Extraction Techniques and Algorithms", ACM Computing Surveys (CSUR), vol. 36, No. 2, 2004, pp. 81-121.

Johnston et al., "Segmentation of Multiple Sclerosis Lesions in Intensity Corrected Multispectral MRI", IEEE Transactions on Medical Imaging, IEEE Service Center, Piscataway, NJ, vol. 15, No. 2, Apr. 1, 1996, pp. 154-169.

Cohen et al., "Rapid and Effective Correction of RF Inhomogeneity for High Field Magnetic Resonance Imaging", Human Brain Mapping, vol. 10, No. 4, 2000, pp, 204-211.

International Search Report including Notification of Transmittal of the International Search Report, International Search Report, and Written Opinion of the International Searching Authority.

* cited by examiner

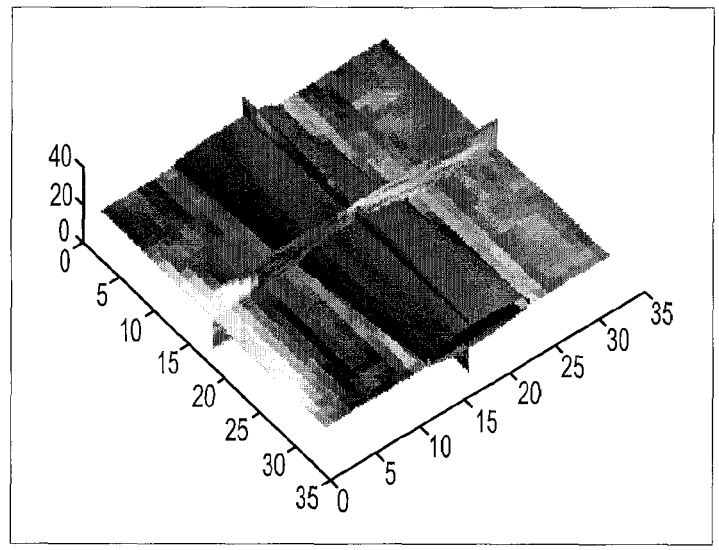
FIG. 5
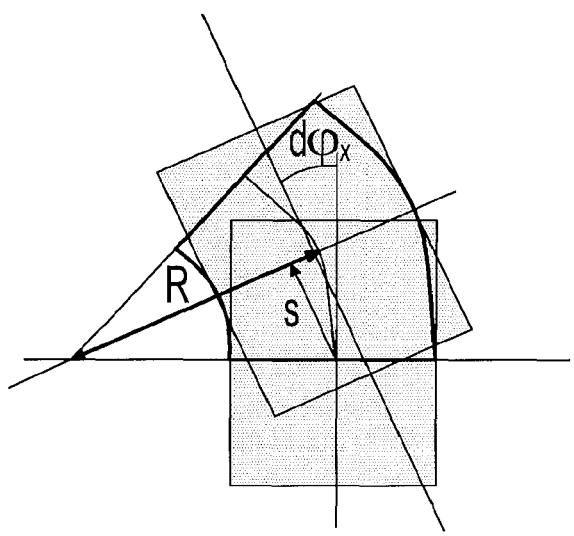
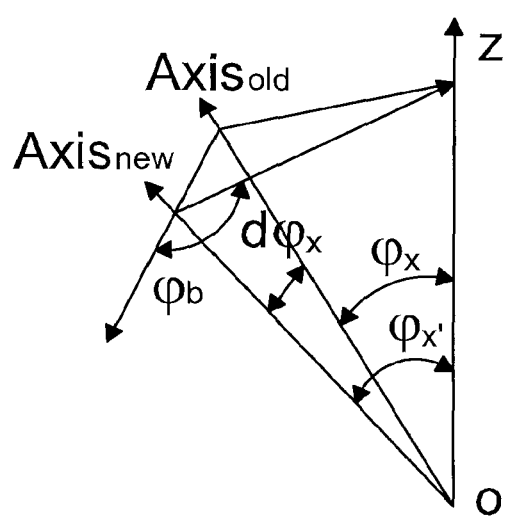
FIG. 6A  FIG. 6B

8,014,581 B2

3D SEGMENTATION OF THE COLON IN MR COLONOGRAPHY

CROSS-REFERENCE TO RELATED APPLICATIONS

This application claims the benefit of Provisional Application No. 60/888,393 filed on Feb. 6, 2007 in the United States Patent and Trademark Office, the contents of which are herein incorporated by reference in its entirety.

BACKGROUND OF THE INVENTION

1. Field of the Invention

The present disclosure relates to image processing, and more particularly to a system and method for 3D segmentation in MR colonography.

2. Description of Related Art

MR colonography is a new technology for the accurate detection of colonic polyps. This technology is less painful for patients than conventional colonoscopy, which leads to better patient participation in screening programs of colorectal cancer. MR colonography is also considered safer than CT colonography, because MR imaging does not expose the patient to radiations. But MR images have higher noise levels and lower resolutions than CT images, which makes the tasks of image post-processing and image analysis more difficult.

There are two main technologies for MR colonography. One is bright lumen colonography and the other one is dark lumen colonography. Both technologies do not need bowel cleansing, giving them a better patient acceptance compared to colonoscopy. However, the dark lumen technique has higher noise level but seems to be superior for detecting polyps.

Therefore, a need exists for a system and method for 3D segmentation in MR colonography to identify the area of the colon and to facilitate the detection and classification colonic lesions.

SUMMARY OF THE INVENTION

According to an embodiment of the present disclosure, a method for segmenting a tubular structure includes providing a three-dimensional image including the tubular structure and at least one seed point within the tubular structure, fitting an initial cylinder into the tubular structure at the seed point in the data, adding cylinder segments to the initial cylinder in forward and backward directions within the three-dimensional image by tracking the cylinder model over the tubular anatomical structure, and outputting cylinder segments as a segmentation of the tube. The propagation of the model finds its support on forces derived from voxel intensities in the image. The model finds its support using a Gaussian distribution of said force so as to being resilient to variability of voxel intensities.

According to an embodiment of the present disclosure, a computer readable medium embodying instructions executable by a processor to perform a method for segmenting an anatomical tubular structure.

According to an embodiment of the present disclosure, a system for segmenting a tubular structure includes a memory device storing a dataset comprising a three-dimensional image containing the tubular structure including at least one seed point within the tubular structure and a plurality of instructions embodying the system for segmenting a tube and a processor for receiving the dataset and executing the plurality of instructions to perform a method for segmenting an anatomical tubular structure.

BRIEF DESCRIPTION OF THE DRAWINGS

Preferred embodiments of the present invention will be described below in more detail, with reference to the accompanying drawings:

FIG. 5 illustrates an initial fitting of the local colon segment according to an embodiment of the present disclosure;

FIGS. 6A-B show the curvature of the bended tube is determined by $d\phi_x$ and the orientation of the bending is determined by Equation 15 according to an embodiment of the present disclosure;

DETAILED DESCRIPTION OF PREFERRED EMBODIMENTS

According to an embodiment of the present disclosure, a system and method for 3D segmentation in MR colonography segments the colon in 3D MR scans of the human abdomen. Results of the segmentation may facilitate polyp detection and classification tasks for both bright and dark lumen cases.

The segmentation is model-based to overcome limitations in imaging dark lumen areas. The model is tube-shaped to direct the segmentation and tracking. Voxel intensities and intensity gradients in the local region are the main image forces considered.

It should be understood that the methods described herein are applicable to applications other than colonography, and may be used for other tube-like structures.

Figure 1A:
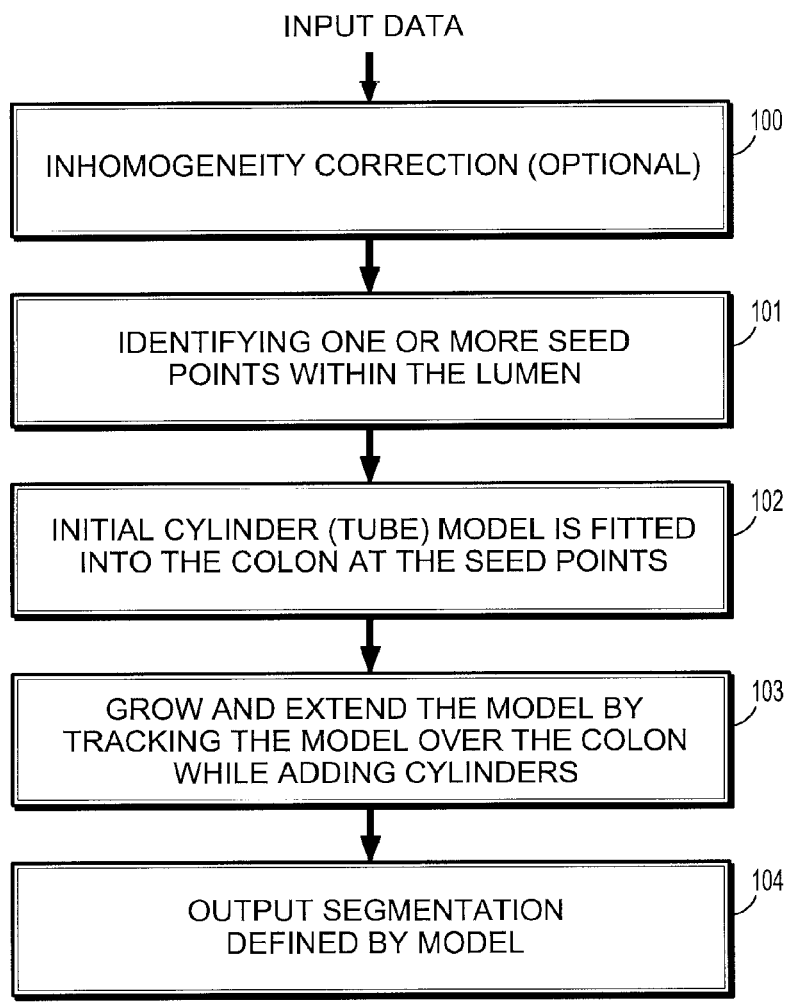
FIGS. 1A-C are a flow chart of a method for segmentation according to an embodiment of the present disclosure.

Referring to FIG. 1A, a method for segmentation includes identifying one or multiple seed points within the lumen 101, for example, as determined by an expert or by a computer program. An initial cylinder (tube) model is fitted into the colon at the seed point(s) as an initialization 102. Starting from the initial model the segmentation is grown and extended, by adding cylinders, in forward and backward directions by tracking the model over the colon 103, which allows one, if needed, to tune the parameters of the shape model for each newly added tube segment individually. The model comprising the cylinders is output as the segmentation 104. The shape model is designed as a bendable cylinder, which is controlled by parameters including: dx, dy for the translation, r for the radius, and $\phi_x$, $\phi_z$ for the rotation angles. The bending angles are determined by the differences of the rotation angles $d\phi_x$, $d\phi_z$ from two consecutive steps.

Figure 1B:
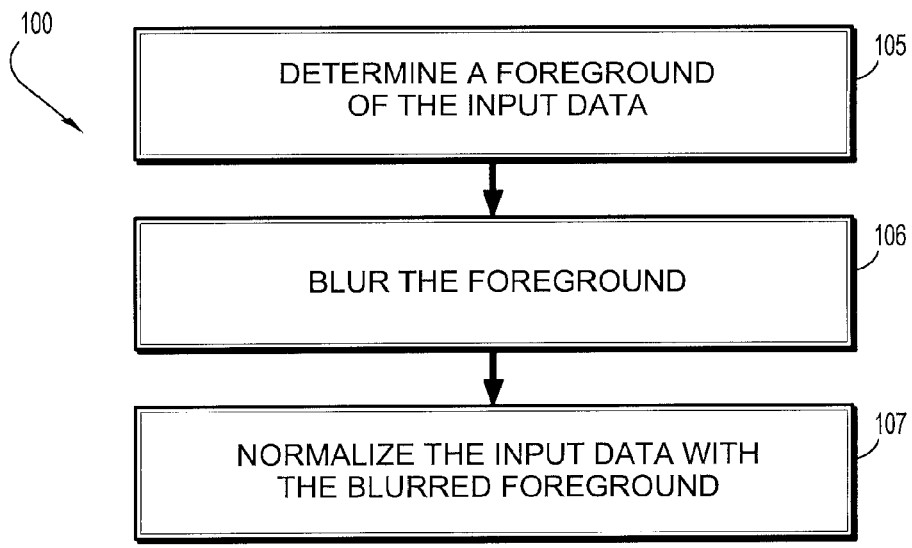

Intensity inhomogeneity is one problem in MR imaging. Referring to FIG. 1B, Inhomogeneity correction 100 may be performed as preprocessing for increasing the image readability in support of the segmentation. By way of example, assume the MR image includes only two layers: the foreground and the background. The intensity values I(x,y,z) of the input 3D image are linearly scaled to the range of [0-127]. Then its histogram H is calculated as:

$$H(i) = \sum_{x,y,z} h(x, y, z), \text{ for } 0 \le i \le 127 \quad (1)$$

where, $$h(x, y, z) = \begin{cases} 1, & \text{when } i - 0.5 \le I(x, y, z) < i + 0.5 \\ 0, & \text{otherwise} \end{cases} \quad (2)$$

H' is determined from the first derivative of H, and it is found that the first index $i_0$ such that $H'(i_0) > 0$ as the threshold value. Each voxel (x,y,z) in the MR image is classified as a foreground voxel, if $I(x,y,z) > i_0$, otherwise it is classified as a background voxel.

For all the foreground voxels, a median intensity value $M_f$ is determined. A foreground image $I_f$ is constructed 105 by replacing all the intensity values of the background voxels by $M_f$:

$$I_f(x, y, z) = \begin{cases} M_f, & \text{if } I(x, y, z) \in [0, i_0] \\ I(x, y, z), & \text{otherwise} \end{cases} \quad (3)$$

The foreground image $I_f$ is then blurred, yielding $I_b$ 106, by convolving it with a 3D Gaussian kernel, whose standard deviation σ is experimentally set to one third of the image size in the X-Y plane. For example, for a 512×512×72-sized 3D image, set σ=170. The inhomogeneity corrected image $I_c$ is derived by normalizing the input I with the blurred foreground $L_b$ 107:

$$I_c(x,y,z) = I(X,y,Z)/I_b(x,y,z) \quad (4)$$

Figure 2:
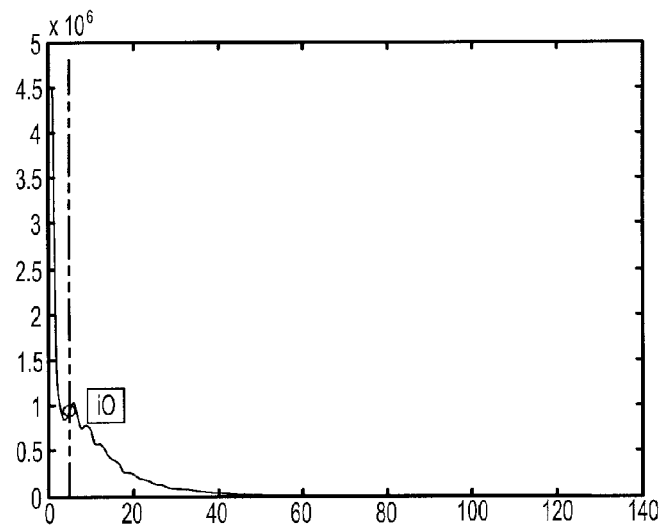
FIG. 2 is a histogram of the input 3D MR image.

FIG. 2 is a histogram of the input 3D MR image. $i_0$ is the intensity threshold to determine whether a voxel belongs to the foreground or the background.

Referring to segmentation initialization 102; the radius and orientation of the local colon segment are determined at a given seed point position(s). Tube-shaped models are fit into the local image. No prior knowledge of the size or the orientation of the colon in the area is needed. Parameters (e.g., translation, radius and rotation angles) are estimated during the fitting process. To obtain a fitting and parameter estimation, the fitting process is implemented as a multi-resolution approach.

Figure 3A:
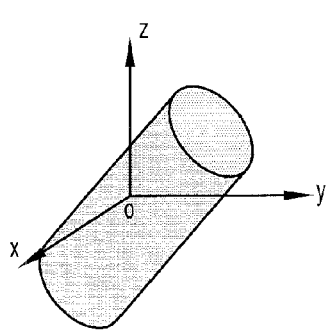
FIG. 3A shows a local colon segment illustrated as a cylinder according to an embodiment of the present disclosure.
Figure 3B:
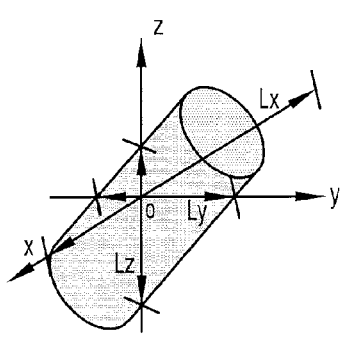
FIG. 3B shows the coordinates lengths inside the colon illustrated as $L_x$, $L_y$ and $L_z$, according to an embodiment of the present disclosure.
Figure 3C:
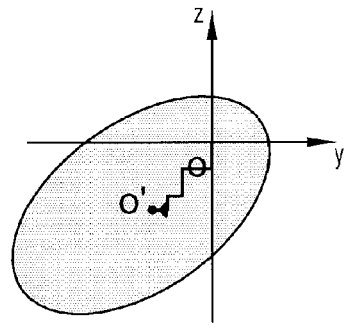
FIG. 3C shows an iterative process of centering along the y and z directions according to an embodiment of the present disclosure.

See for example, FIGS. 3A-C, which illustrate a local colon segment illustrated as the cylinder with a seed point o inside (FIG. 3A), the coordinate lengths inside the colon shown as $L_x$, $L_y$ and $L_z$ (FIG. 3B), and iteratively centering in y and z directions to find the new center o' (FIG. 3C).

As shown in FIGS. 3A-C, for a local colon segment illustrated as a cylinder, and o is the seed point, along the x, y and z coordinates, lengths $L_x$, $L_y$ and $L_z$ of the segments whose intensities are below a certain threshold are determined. The threshold is set experimentally. But for dark lumen MRI after intensity inhomogeneity correction, this threshold does not vary substantially. For example, when the image intensity is re-scaled to the range of [0, 1.5], a threshold value of 0.1 works for most of the image data that we have tested.

For a seed point o that is not located on the geometrical centerline of the colon, the seed point is updated automatically by the fitting process to be located on the centerline. The coordinate with the biggest L, e.g., in FIG. 3B, $L_x$, is left out and the center along the other two coordinates are iteratively located, as shown in FIG. 3C, to find the geometrical center o'. Where only the 1D profiles are used, the computation is fast.

Figure 4A:
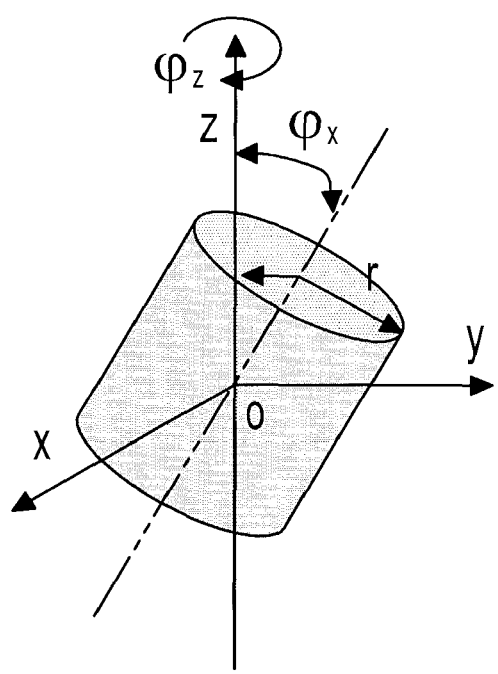
FIG. 4A shows a tube-shaped model defined by 3 parameters, r, $\phi_x$ and $\phi_z$ according to an embodiment of the present disclosure.
Figure 4B:
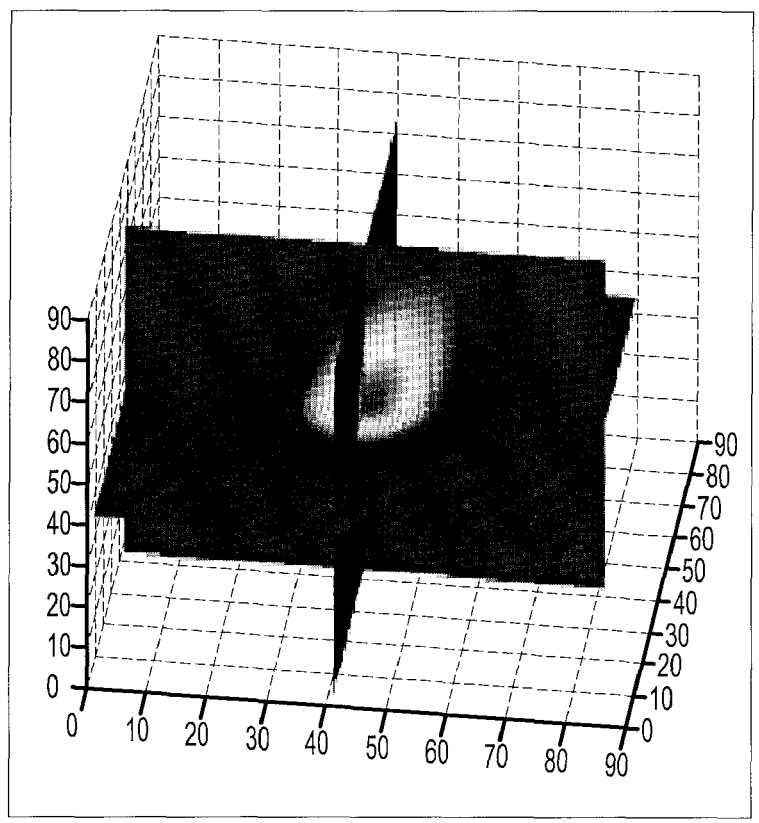
FIG. 4B shows a slice view of a model which is rotated by $\phi_x$ and $\phi_z$ according to an embodiment of the present disclosure.
Figure 4C:
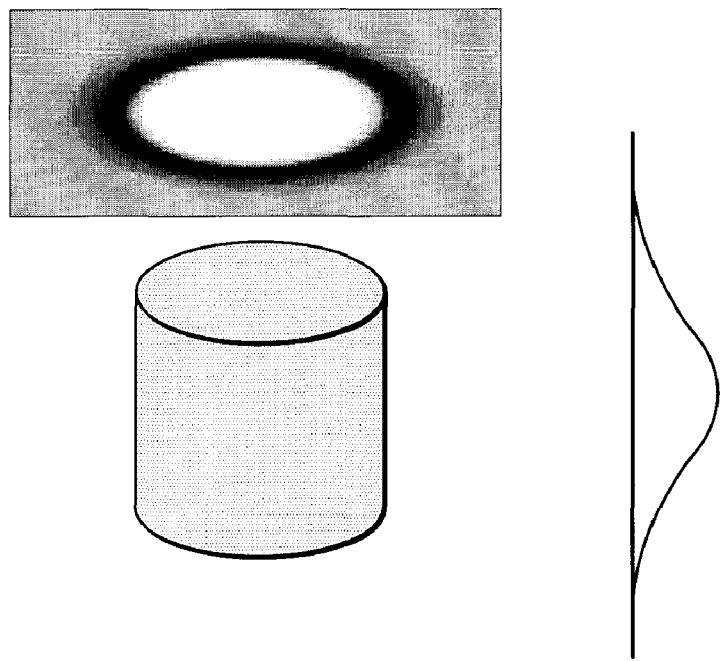
FIG. 4C shows a structure of the un-rotated tube model according to an embodiment of the present disclosure.
Figure 4D:
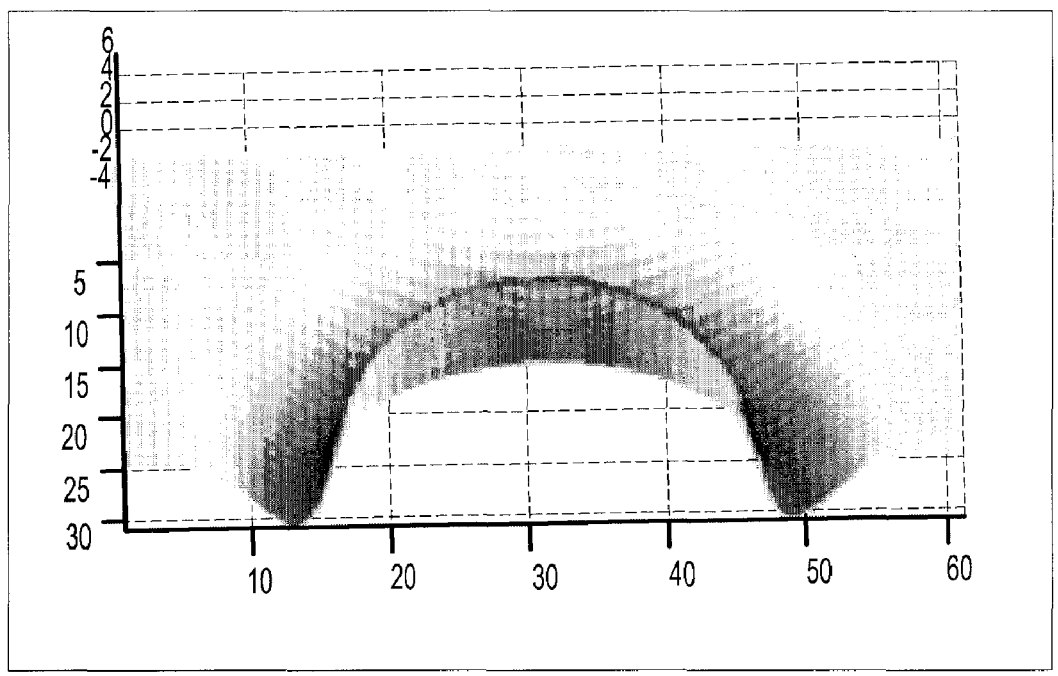
FIG. 4D shows an intensity values of a cross section plane showing intensity values along a center line according to an embodiment of the present disclosure.

FIGS. 4A-D show the tube-shaped model defined by 3 parameters, r, φx and φz (FIG. 4A), the slice view of a model which is rotated by φx and φz (FIG. 4B), the structure of the un-rotated tube model (FIG. 4C) and the intensity values of a cross section plane. Only half of the plane is drawn to show the intensity values along the center line (FIG. 4D).

After the geometrical center o' and the new $L'_x$, $L'_y$ and $L'_z$ are determined, the radius and orientation of the local colon segment are estimated. The radius r and rotation angles $\phi_x$, $\phi_z$ are illustrated in FIG. 4A. Hence r is derived by:

$$r = \sqrt{\frac{2}{\frac{1}{\left(\frac{L'_x}{2}\right)^2} + \frac{1}{\left(\frac{L'_y}{2}\right)^2} + \frac{1}{\left(\frac{L'_z}{2}\right)^2}}} \quad (5)$$

And $\phi_x$, $\phi_z$ are:

$$\phi_x = \pm a\sin\left(\frac{2r}{L'_z}\right) \quad (6)$$

$$\phi_z = \pm a\sin\left(\frac{2\sqrt{r^2 - \left(\frac{L'_x}{2}\right)^2 \cdot \cos^2(\phi_x)}}{L'_x \cdot \sin(\phi_x)}\right) \quad (7)$$

Both $\phi_x$ and $\phi_z$ can be either positive or negative. Hence there are 4 possible configurations of the orientation angles. The tube-shaped model is designed based on the intensity profile of the colon image. As shown in FIG. 4B, which is the slice view of a tube-shaped model, the intensities of the voxels inside the tube model are set positive, and the voxels outside are set negative. Thus when the model is fit onto the image, only template matching is needed and the lowest dot product value of the model and the local image is determined.

For normalization purposes, the summation of the intensity value of each voxel in the tube-shaped model needs to be zero.

Therefore, the model is designed as follows: For a un-rotated model, whose long axis is parallel to the z coordinate, as shown in FIG. 4C, the intensity value along the z direction is modeled as a Gaussian with the standard deviation set to r, which means more importance is given to the tube's center area. If the intensity summation is zero in the cross section, then the intensity summation of the whole volume can be made to be zero. Hence, we model the voxel's intensity value i in the cross section plane as two Beta functions with respect to its Euclidian distance d to the center axis:

$$i(d) = \begin{cases} \beta_1 \cdot \left(\frac{d-r}{r_{wall}}\right)^{a_1-1} \cdot \\ \left(1 - \frac{d-r}{r_{wall}}\right)^{b_1-1}, & \text{when } d > r \text{ and } d < r + r_{wall} \\ \beta_2 \cdot \left(\frac{r-d}{2r}\right)^{a_2-1} \cdot \\ \left(1 - \frac{r-d}{2r}\right)^{b_2-1}, & \text{when } d \le r \end{cases} \quad (8)$$

$$\beta_1 = \frac{1}{r \cdot r_{wall} \cdot B(a_1, b_1) - r_{wall}^2 \cdot B(a_1+1, b_1)} \quad (9)$$

$$\beta_2 = \frac{1}{r^2 \cdot B(a_2, b_2) - 4r^2 \cdot F_B(0.5; a_2+1, a_2) \cdot B(a_2-1, b_2)}$$

Where $B(a,b)$ is a Beta function, $F_B(x;a,b)$ is a cumulative Beta function, and $\Gamma(x)$ is the Gamma function:

$$B(a, b) = \frac{\Gamma(a)\Gamma(b)}{\Gamma(a-b)} \quad (10)$$

$$F_B(x; a, b) = \frac{1}{B(a, b)} x^{a-1}(1-x)^{b-1}$$

$$\Gamma(x) = \int_0^\infty t^{x-1} e^{-t} dt$$

Here $r_{wall}$, $(a_1, b_1)$ and $(a_2, b_2)$ are used to control the curve shape of the intensity profile along the centerline of the cross section. As shown in FIG. 4D, $r_{wall}$ is set to approximate the thickness of the colon wall, i.e., the width of the curve that is below zero. And $(a_1, b_1)$ and $(a_2, b_2)$ are experimentally set to $a_1=2$, $b_1=5$, $a_2=1.5$, and $b_2=1.5$.

From Equations 5, 6, 7, the four sets of rotation angles are tested and a best match is selected. Starting near this set of parameters r, $\phi_x$ and $\phi_z$ an exhaustive search is performed for the optimal parameter set. This search is done in multi-resolutions to achieve faster implementation. See FIG. 5 for an initialization result.

FIG. 5 shows a tube as the initial fitting of the local colon segment. Shown as an elevated tubular structure displayed as on a MR image of the colon.

Figure 1C:
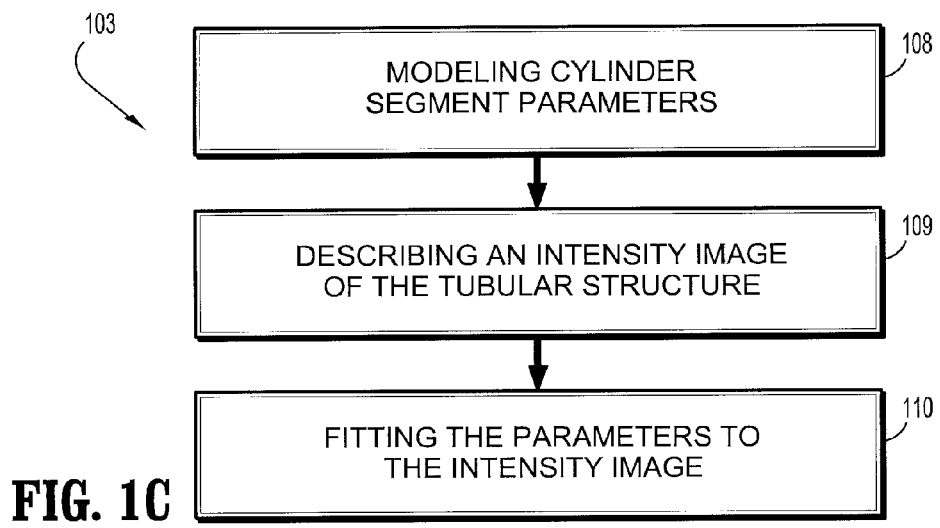

Referring to segmentation via tracking 103 and FIG. 1C; After the initialization, a tracking process is performed from the initial model at both ends of the cylinder. Tunable parameters 108 during the tracking process include: dr for the tube's radius change, $d\phi_x$ and $d\phi_z$ for the tube's orientation changes, and dx, dy for the center point's translations within the plane of the colon cross section.

Note that $d\phi_x$ and $d\phi_z$ are rotation angles in the local coordinates. In the global coordinates, the newer orientation angles $\phi'_x$ and $\phi'_z$ are derived by:

$$\phi'_x = a\cos\left(\begin{array}{c} -\sin(\phi_x)\cos(d\phi_z)\sin(d\phi_x) + \\ \cos(\phi_x)\cos(d\phi_x) \end{array}\right) \quad (11)$$

$$\phi'_z = a\tan\left(\frac{\begin{array}{c}\cos(\phi_z)\sin(d\phi_z)\sin(d\phi_x) + \\ \sin(\phi_z)\cos(\phi_x)\cos(d\phi_z)\sin(d\phi_x) + \\ \sin(\phi_z)\sin(\phi_x)\cos(d\phi_x) \end{array}}{\begin{array}{c}-\sin(\phi_z)\sin(d\phi_z)\sin(d\phi_x) + \\ \cos(\phi_z)\cos(\phi_x)\cos(d\phi_z)\sin(d\phi_x) + \\ \cos(\phi_z)\sin(\phi_x)\cos(d\phi_x) \end{array}}\right) + k$$

where:

$$k = \begin{cases} \pi, & \text{when } \frac{\begin{array}{c}-\sin(\phi_z)\sin(d\phi_z)\sin(d\phi_x) - \\ \cos(\phi_z)\cos(\phi_x)\cos(d\phi_z)\sin(d\phi_x) - \\ \cos(\phi_z)\sin(\phi_x)\cos(d\phi_x) \end{array}}{\sin(\phi'_x)} < 0 \\ 0, & \text{otherwise} \end{cases} \quad (12)$$

Also note that (dx,dy) are not the translations in the global coordinates. The global translation [dx', dy', dz'] can be derived by:

$$\begin{pmatrix} dx' \\ dy' \\ dz' \end{pmatrix} = \left(\begin{pmatrix} 1 & 0 & 0 \\ 0 & \cos(\phi'_x) & -\sin(\phi'_x) \\ 0 & \sin(\phi'_x) & \cos(\phi'_x) \end{pmatrix} \cdot \begin{pmatrix} \cos(\phi'_z) & -\sin(\phi'_z) & 0 \\ \sin(\phi'_z) & \cos(\phi'_z) & 0 \\ 0 & 0 & 1 \end{pmatrix}\right)^T \cdot \begin{pmatrix} dx \\ dy \\ 0 \end{pmatrix} \quad (13)$$

The tracking template is similar to the tube-shaped model used in the initialization step. However, two more features are added to the model to make it more robust for noisy images and to better fit in highly curved colon regions.

The template is made bendable. As shown in FIG. 6A, in the local coordinate, the step size s and rotation angle $d\phi_x$ determine the curvature of the template. The curvature radius R is set as:

$$R = \frac{s}{\sin(d\phi_x)} \quad (14)$$

Figure 7A:
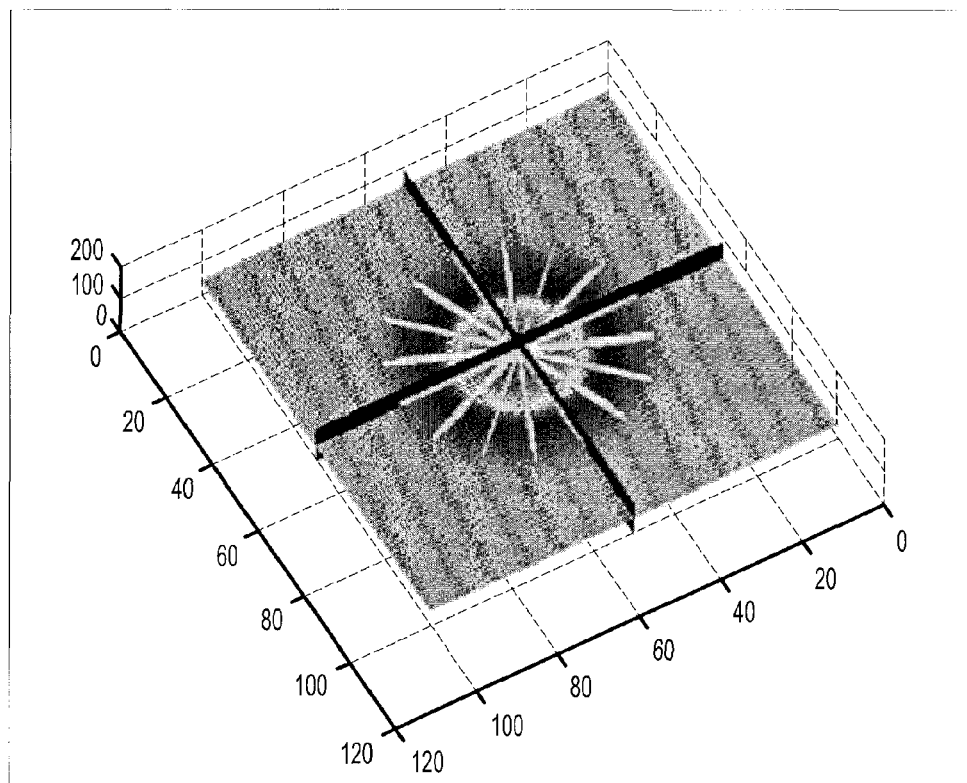
FIGS. 7A-C show a cross section view of the edge template, an axis view of the edge template, and the 1D profile is matching with the edge detectors according to an embodiment of the present disclosure.
Figure 7B:
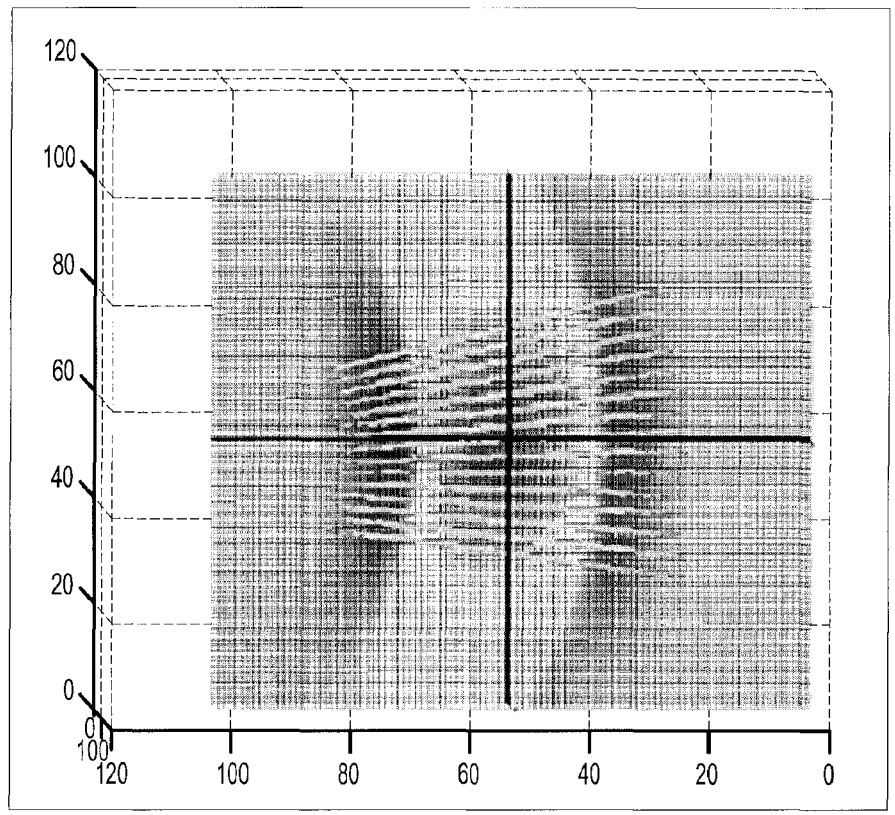

And as shown in FIG. 7B, the bending orientation $\phi_b$ is determined as:

$$\phi_b = \left(a\cos\left(\frac{\cos(\phi_x) - \cos(d\phi_x)\cos(\phi'_x)}{\sin(d\phi_x)\sin(\phi'_x)}\right) + k\right) \cdot p \quad (15)$$

where, $$k = \begin{cases} \pi, & \text{when } d\phi_x < 0, s > 0 \text{ or } d\phi_x > 0, s < 0 \\ 0, & \text{otherwise} \end{cases} \quad (16)$$

and, $$p = \begin{cases} -1, & \text{when } d\phi_z < 0 \\ 1, & \text{otherwise} \end{cases} \quad (17)$$

The tube-shaped model is separated into two independent templates, the edge term and the intensity term. The edge term is discretized into several sets of 1D profiles. Thus, the normalization problem need not be considered.

FIGS. 6A-B show the curvature of the bended tube is determined by $d\phi_x$ and the orientation of the bending is determined by Equation 15, respectively.

Figure 7C:
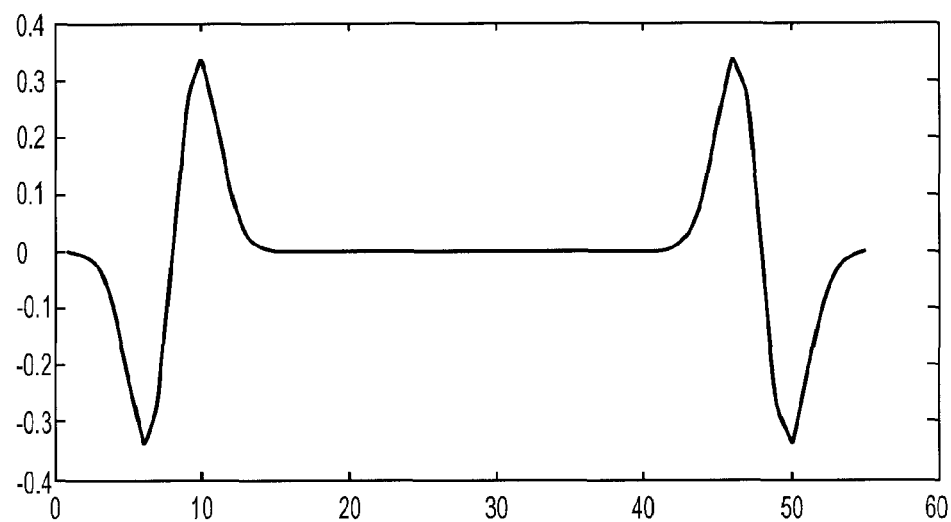

FIGS. 7A-C illustrate a cross section view of the edge template, an axis view of the edge template, and the 1D profile is matching with the edge detectors, respectively.

And as shown in FIG. 7A, on the cross section of the tube model, the edge template is discretized into 8 1D profiles that are angularly evenly spaced. And as shown in FIG. 7B, along the axis of the tube, it is also discretized into a set of cross section planes. The angular range of the plane position is experimentally determined by $[-1.3 \cdot r/R, 1.3 \cdot r/R]$, where R is the curvature radius from Equation 14.

The 1D profile is set as the combination of two edge detectors, as shown in FIG. 7C, which is the summation of two Gaussians' derivatives.

Figure 8:
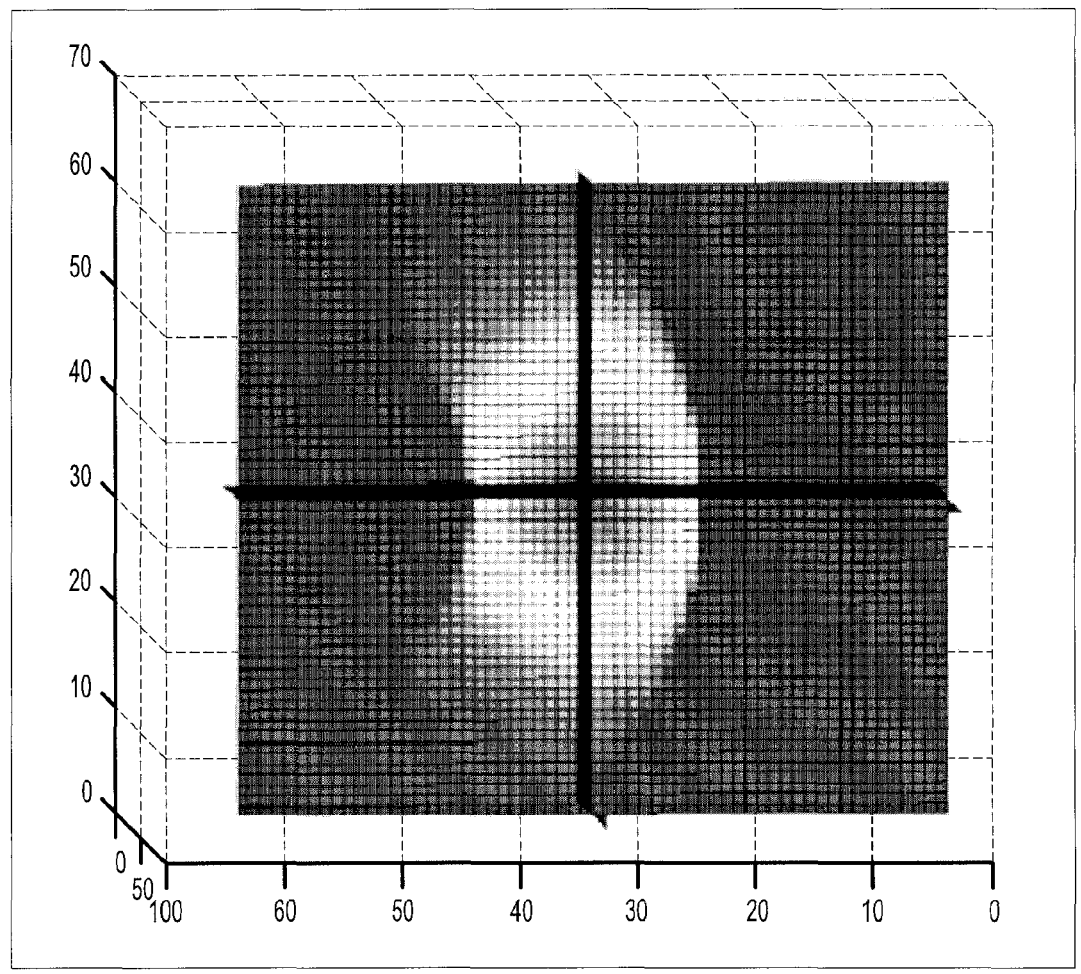
FIG. 8 illustrates a slice view of an intensity template according to an embodiment of the present disclosure.

FIG. 8 is a slice view of the intensity template.

The intensity term is set 109 in a similar way as a non-negative form of the model in the initialization step. For a voxel at position (x,y,z) in an un-rotated template, set:

$$c = y \cdot \cos(d\phi_z) + x \cdot \sin(d\phi_z) \quad (18)$$

$$\alpha = a\tan\left(\frac{z}{R-c}\right) \quad (19)$$

Then the distance from this voxel to the nearby tube axis is:

$$d = ((R\cos(\alpha)-R)\sin(d\phi_z)+x)^2 + ((R\cos(\alpha)-R)\cos(d\phi_z)+y)^2 + (z-R\sin(\alpha))^2 \quad (20)$$

And the intensity of this voxel in the template is defined as:

$$i(d) = \frac{\beta_2 \left(\frac{r-d}{2r}\right)^{a_2-1} \left(1 - \frac{r-d}{2r}\right)^{b_2-1}}{\sqrt{2\pi}\, r} e^{\frac{a^2 R^2}{2r^2}} \quad (21)$$

See FIG. 8 for an example of the intensity template.

The goal of tracking is to find the best set of parameters step by step while the model grows.

For finding an optimal fit, a sampling approach may be used 110. Based on the parameter values from the previous step, a set of distributions of the possible parameter changes are defined and randomly sampled.

The distributions correlate closely to the step size s. If s is small, the distribution range can be made narrower, because with smaller s, the colon's shape and orientation have less variations.

Among the 5 tuneable parameters, dr, $d\phi_x$, dx, and dy can be modeled as Gaussian distributions. Their standard deviations will be smaller if a smaller s is used.

The other parameter $d\phi_z$ is randomly selected in the range of $[0,2\pi]$, which means it is independent with the value of s. Since we have two separated terms, the edge term and the intensity term, we have to properly combine them. The two terms' changing rates were tested on a phantom image, and the energy function of the edge term was found to change 50 to 100 times faster than the intensity term. Thus, the rate k can be set approximated as k=70. Suppose $E_i$ and $E_e$ are energy values from the intensity and edge terms that are to be minimized. Then the combined energy function is set as:

$$E = e^{k(E_i - E_{ip})} + e^{E_e - E_{ep}} \quad (22)$$

where $E_{ip}$ and $E_{ep}$ are the energy values from the previous step. The combined energy value E gives a performance measurement of the tracking. If E keeps less than or equal 2, it is assumed that the tracking process is not getting worse.

Since random sampling alone is not efficient, the sampling center can be iteratively shifted and the distribution range narrowed if E is less than a certain threshold. In this way a sampling method may converge faster.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 9:
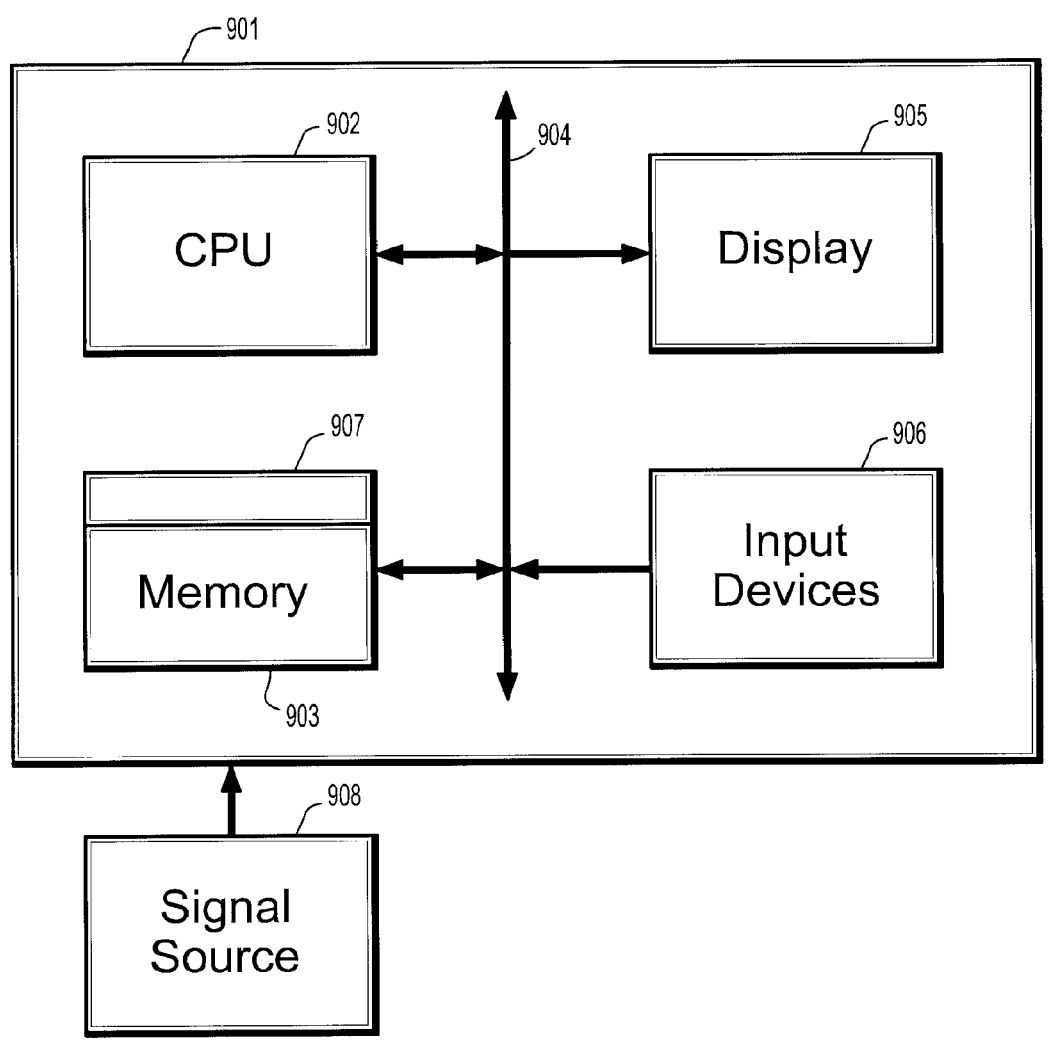
FIG. 9 is a diagram of exemplary computer system for automatically estimating a volume and diameter of a pulmonary nodule according to an embodiment of the present disclosure.

Referring to FIG. 9, according to an embodiment of the present invention, a computer system 901 for implementing a method for 3D segmentation in MR colonography can comprise, inter alia, a central processing unit (CPU) 902, a memory 903 and an input/output (I/O) interface 904. The computer system 901 is generally coupled through the I/O interface 904 to a display 905 and various input devices 106 such as a mouse and keyboard. The support circuits can include circuits such as cache, power supplies, clock circuits, and a communications bus. The memory 903 can include random access memory (RAM), read only memory (ROM), disk drive, tape drive, etc., or a combination thereof. The present invention can be implemented as a routine 907 that is stored in memory 903 and executed by the CPU 902 to process the signal from the signal source 908. As such, the computer system 101 is a general purpose computer system that becomes a specific purpose computer system when executing the routine 907 of the present invention.

The computer platform 901 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for 3D segmentation in MR colonography, it is noted that modifications and variations can be made by persons skilled in the art in light of the above teachings. It is therefore to be understood that changes may be made in embodiments of the present disclosure that are within the scope and spirit thereof.

What is claimed is:

1. A method for segmenting a tubular structure comprising:

providing a three-dimensional image including the tubular structure;

providing at least one seed point within the tubular structure;

fitting an initial cylinder into the tubular structure at the seed point;

adding cylinder segments to the initial cylinder in forward and backward directions within the three-dimensional image by tracking the cylinder segments over the tubular structure;

modeling each cylinder segment using parameters to account for a three-dimensional orientation, a radius, a length and a curvature;

describing an intensity image of the tubular structure using a second model to represent an edge and intensity distribution of the tubular structure;
fitting the parameters as the cylinder segment is added to the intensity image; and
outputting the cylinder segments as a segmentation of the tube.

2. The method of claim 1, wherein the cylinder segments form a bendable cylinder, which is controlled by parameters including: dx, dy for the translation, r for the radius, and $\phi_x$, $\phi_y$ for the rotation angles on a cylinder-by-cylinder basis.

3. The method of claim 2, the parameters including cylinder bending angles, wherein the bending angles are determined by differences of the rotation angles $d\phi_x$, $d\phi_y$ from two consecutive cylinders.

4. The method of claim 1, further comprising an inhomogeneity correction applied to the three-dimensional image.

5. The method of claim 4, further comprising:
determining a foreground of the three-dimensional image;
blurring the foreground to determine a blurred foreground; and
normalizing the three-dimensional image with the blurred foreground.

6. A non-transitory computer readable medium embodying instructions executable by a processor to perform a method for segmenting a tubular structure, comprising:
computer readable medium embodying instructions for providing a three-dimensional image including the tubular structure;
computer readable medium embodying instructions for providing at least one seed point within a lumen of the tubular structure;
computer readable medium embodying instructions for fitting an initial cylinder into the tubular structure at the seed point;
computer readable medium embodying instructions for adding cylinder segments to the initial cylinder in forward and backward directions within the three-dimensional image by tracking over the tubular structure;
computer readable medium embodying instructions for modeling each cylinder segment using parameters to account for a three-dimensional orientation, a radius, a length and a curvature;
computer readable medium embodying instructions for describing an intensity image of the tubular structure using a second model to represent an edge and intensity distribution of the tubular structure;
computer readable medium embodying instructions for fitting the parameters as the cylinder segment is added to the intensity image; and
computer readable medium embodying instructions for outputting cylinder segments as a segmentation of the tube.

7. The computer readable medium embodying instructions of claim 6, wherein the cylinder segments form a bendable cylinder, which is controlled by parameters including: dx, dy for the translation, r for the radius, and $\phi_x$, $\phi_y$ for the rotation angles on a cylinder-by-cylinder basis.

8. The computer readable medium embodying instructions of claim 7, the parameters including cylinder bending angles, wherein the bending angles are determined by differences of the rotation angles $d\phi_x$, $d\phi_y$ from two consecutive cylinders.

9. The computer readable medium embodying instructions of claim 6, further comprising an inhomogeneity correction applied to the three-dimensional image.

10. The computer readable medium embodying instructions of claim 9, further comprising:
computer readable medium embodying instructions for determining a foreground of the three-dimensional image;
computer readable medium embodying instructions for blurring the foreground to determine a blurred foreground; and
computer readable medium embodying instructions for normalizing the three-dimensional image with the blurred foreground.

11. A system for segmenting a tubular structure comprising:
a memory device storing a dataset comprising a three-dimensional image containing the tubular structure including at least one seed point within the tubular structure and a plurality of instructions embodying the system for segmenting a tube; and
a processor for receiving the dataset and executing the plurality of instructions to perform a method comprising,
fitting an initial cylinder into the tubular structure at the seed point;
adding cylinder segments to the initial cylinder in forward and backward directions within the three-dimensional image by tracking the cylinder segments over the tubular structure;
modeling each cylinder segment using parameters to account for a three-dimensional orientation, a radius, a length and a curvature;
describing an intensity image of the tubular stricture using a second model to represent an edge and intensity distribution of the tubular structure;
fitting the parameters as the cylinder segment is added to the intensity image; and
outputting cylinder segments as a segmentation of the tube.

* * * * *